US009296334B2

(12) United States Patent
Hampiholi (10) Patent No.: US 9,296,334 B2
(45) Date of Patent: Mar. 29, 2016

(54) SYSTEMS AND METHODS FOR DISABLING A VEHICLE HORN (75) Inventor: Vallabha Vasant Hampiholi, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 212 days.

(21) Appl. No.: 13/537,893

(22) Filed: Jun. 29, 2012

(65) Prior Publication Data
US 2014/0005884 A1   Jan. 2, 2014

(51) Int. Cl.
*B60Q 5/00* (2006.01)
(52) U.S. Cl.
CPC ........................................ *B60Q 5/00* (2013.01)
(58) Field of Classification Search
None
See application file for complete search history.

(56) References Cited

U.S. PATENT DOCUMENTS

| | | | | |
|---|---|---|---|---|
| 6,271,746 B1* | 8/2001 | Lisiak | | B60Q 5/00 340/425.5 |
| 6,366,207 B1* | 4/2002 | Murphy | | A61N 5/18 340/540 |
| 6,917,680 B1* | 7/2005 | Korn | | H04M 1/1663 379/373.01 |
| 8,144,002 B2* | 3/2012 | Kiuchi | | G08G 1/166 340/435 |
| 2002/0183929 A1* | 12/2002 | Tsuji | | G08G 1/166 701/301 |
| 2007/0102591 A1* | 5/2007 | Toth | | B61L 29/28 246/122 R |
| 2007/0136083 A1* | 6/2007 | Simon | | B60R 25/04 701/36 |

FOREIGN PATENT DOCUMENTS

| | | | | |
|---|---|---|---|---|
| CN | WO2011044723 | * | 4/2011 | ............. B60Q 5/00 |
| CN | WO2011044723 A1 | * | 4/2011 | ............. B60Q 5/00 |
| DE | 102004050597 A1 | * | 4/2006 | ............. B60Q 1/143 |

* cited by examiner

*Primary Examiner* — John R Olszewski
*Assistant Examiner* — Jess Whittington
(74) *Attorney, Agent, or Firm* — Alleman Hall McCoy Russell & Tuttle LLP (57) ABSTRACT

Various embodiments relate to controlling honking of a vehicle horn. A location of a vehicle and a location of one or more points along a route where a vehicle horn is disabled may be received at a vehicle computer. Based on a location of the vehicle and the location of the one or more vehicle horn disabling locations, a determination may be made that the vehicle is in the vicinity of the one or more vehicle horn disabling points. One or more instructions from the vehicle computer may be transmitted to disable the vehicle horn when in the vicinity of the one or more vehicle horn disabling locations. In some embodiments, if the vehicle is in a disabling location, overriding instructions for overriding the disabled horn may be transmitted or executed if an emergency event is detected.

25 Claims, 4 Drawing Sheets

SYSTEMS AND METHODS FOR DISABLING A VEHICLE HORN

TECHNICAL FIELD

Various embodiments relate to disabling a vehicle horn. In some embodiments, the horn is disabled in specific locations on a route.

BACKGROUND

Restrictions on honking, especially on excessive honking, have been implemented in certain regions of the world. However, these restrictions are ignored by some drivers despite visible signs on roadways warning against honking. In many developing countries, for example, honking is used to alert other vehicles of a vehicle's location, that the vehicle is about to pass, that the vehicle is in an emergency and driving fast, or alerting a driver of a traffic rule violation which the driver has committed or is about to commit. While more heavily enforced and with heavy fines imposed, haphazard honking is seen in developed countries as well. In the United States, for example, states like California and New York impose fines as high as $350 for honking in a non-emergency event or for reasons other than safety reasons. Nevertheless, many drivers still honk in non-emergency situations such as at traffic lights or at pedestrians having the right of way strolling across an intersection. While law enforcement has the ultimate responsibility for enforcing these violations, there are many violations that go unnoticed.

SUMMARY

According to one aspect, in a method for disabling a vehicle horn, a location of a vehicle and one or more points along a route where a vehicle horn is disabled may be received at a vehicle computer. Based on the location of the vehicle and the location of the one or more vehicle horn disabling points, it may be determined that the vehicle is in the vicinity of the one or more vehicle horn disabling points. One or more instructions may be transmitted from the vehicle computer to disable the vehicle horn when in the vicinity of the one or more vehicle horn disabling points.

In some embodiments, an emergency event may be detected at or near the one or more vehicle horn disabling points. Overriding instructions may be transmitted by the vehicle computer to override a horn disabling based on detecting the emergency event. As one non-limiting example, one or more images from a vehicle-based camera may be received of one or more objects in a field of view of the vehicle-based camera. The emergency event may be identified based on the one or more images.

In some embodiments, the vehicle horn may be associated with a horn disabling instruction. One or more instructions executing the horn disabling instruction may be transmitted to disable the vehicle horn.

According to one aspect, in a system for disabling a horn at one or more horn disabling locations on a route which may include at least one vehicle computer, information may be received defining one or more locations where a vehicle horn is disabled and identifying that a vehicle is in a vicinity of the one or more horn disabling locations. Based on the defining information and the identifying information, one or more instructions may be transmitted to disable the vehicle horn.

The information identifying the location of the vehicle may be, as a non-limiting example, GPS data. Based on the GPS data, it may be determined that the vehicle is in the vicinity of the one or more vehicle horn disabling locations.

In some embodiments, the information identifying the location of the vehicle may be based on one or more images captured by a vehicle camera of one or more road signs identifying the one or more horn disabling locations. The one or more images may be processed for identifying that the vehicle is in the vicinity of the one or more horn disabling locations.

In some embodiments, the system may also include a storage device, such as (and without limitation) a database or memory. The storage device may store the one or more locations where a vehicle horn is disabled.

In some embodiments, the system may include a vehicle clock. The vehicle clock may be used to disable the vehicle horn when the use of the vehicle horn has exceeded a time period of use.

In some embodiments, when the vehicle is outside of a horn disabling location and it is determined that the vehicle horn is in use during a non-emergency event, one or more instructions to disable the vehicle horn may be transmitted. Alternatively, instructions may be transmitted to override the disabled horn when an emergency event is detected and the vehicle is in a horn disabling zone.

According to one aspect, in a system for controlling honking of a vehicle horn in one or more vehicle horn disabling locations, which may include at least one vehicle computer, information defining one or more locations where a vehicle horn is disabled and information identifying that a vehicle is in a vicinity of the one or more horn disabling locations may be received. One or more emergency events may be detected while the vehicle is in the vicinity of the one or more horn disabling locations. In some embodiments, the emergency events may be detected based on objects detected by one or more vehicle sensors or one or more vehicle cameras.

One or more restricting or overriding instructions for restricting or overriding one or more instructions to disable the vehicle horn may be transmitted in response to detecting the emergency event(s). In some embodiments, an alert may be output in the vehicle when the one or more emergency events are detected. In some embodiments, the vehicle horn may be automatically honked by transmitting one or more instructions for honking the horn based on one or more automatic honking triggering events.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Additionally, the disclosure and arrangement of the figures is non-limiting. Accordingly, the disclosure and arrangement of the figures may be modified or re-arranged to best fit a particular implementation of the various embodiments of the invention.

Figure 1:
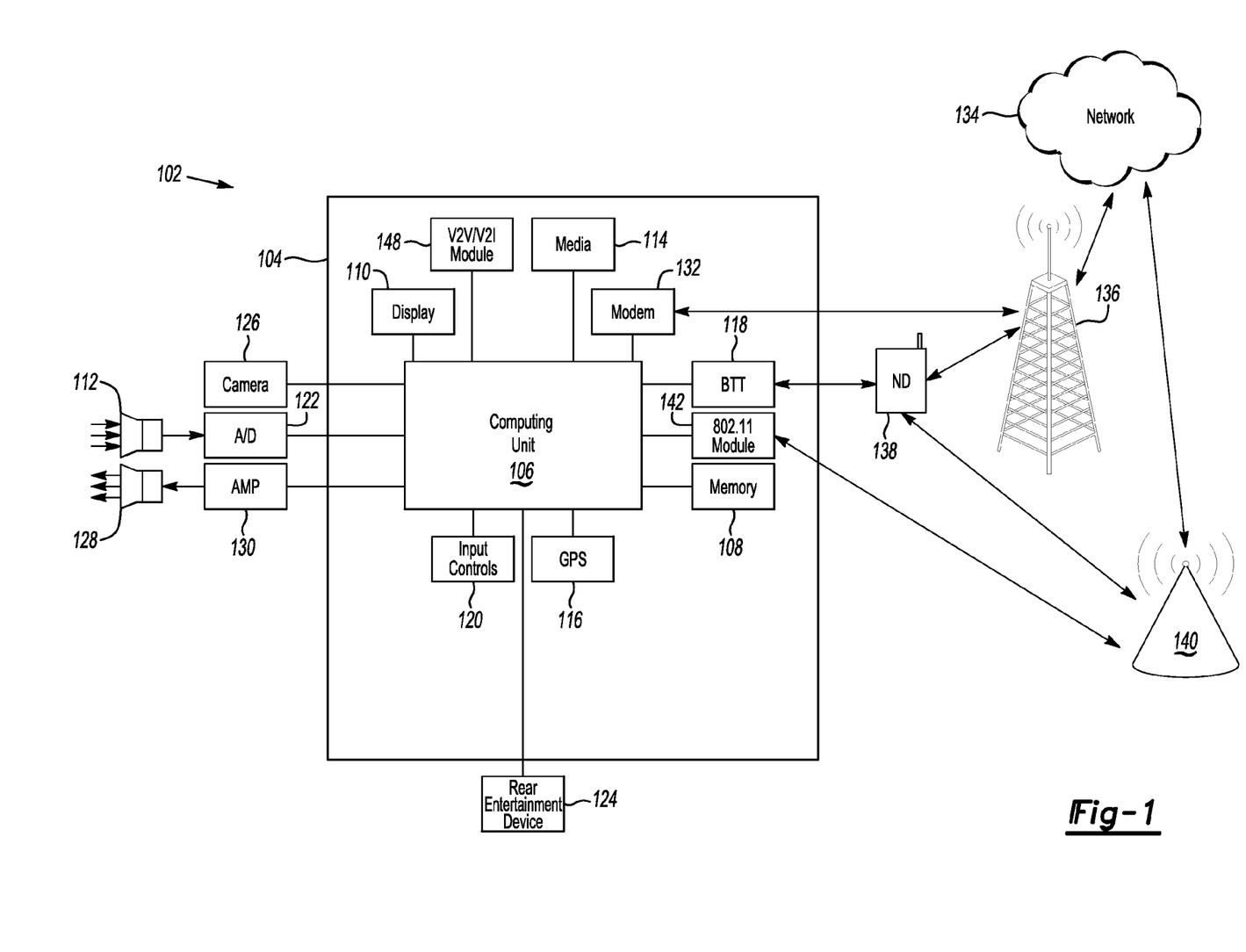
FIG. 1 illustrates a block architecture of a vehicle computing system.

Unnecessary honking can lead to an increase in global noise pollution, distractions to drivers and pedestrians, and can be a disturbance when near hospitals, schools, homes, and the like. However, modern vehicles can be configured with systems which may permit disabling of a vehicle horn as described in the various embodiments. FIG. 1 is a block diagram of a vehicle computing system (VCS) 102. Within the vehicle, a head unit 104 may have an onboard computing unit 106 having one or more processors (not shown) that provide for on-board processing of instructions and controls received by the VCS 102. Data that may be received and processed by the unit 106 may be stored in memory 108. The memory 108 may include non-persistent or volatile memory, such as (and without limitation) random access memory (RAM), and persistent or non-volatile memory, such as (and without limitation) a hard disk drive (HDD) or flash memory.

The head unit 104 may also include a visual front end interface, such as a display 110, located in the vehicle. The display 110 may be an LCD display or a graphical display. In some embodiments, the interface may have a touch sensitive screen. In additional or alternative embodiments, the interaction with the VCS 102 may occur through, button presses, audible speech and/or speech synthesis and displayed on display 110.

The VCS 102 is also provided with a number of different modules through which the user can interface or interact with the VCS 102. For example, the vehicle may be provided with a microphone 112, one or more media components 114 (e.g., and without limitation, one or more input modules, such as, and without limitation, an auxiliary input or USB input for connected devices, a radio, a CD/DVD player, satellite radio, and the like), a GPS module 116, and a BLUETOOTH module 118. Additional media components may include one or more rear entertainment devices 124. The rear entertainment device 124 may include one or more media players (e.g., a DVD player) and one or more displays visible to rear seat passengers from which video, picture and/or audio may be output.

The computing unit 106 may be in communication with a vehicle network (not shown) that communicates data to and from the various modules. Non-limiting examples of a vehicle network include an SAE J1850 bus, a CAN bus, a GMLAN bus, and any other like vehicle data buses. The vehicle network may additionally or alternatively be a network for use with infotainment systems such as a media oriented system transport (MOST), Ethernet, or an Audio-Video Bridge (AVB) network.

Additional modules of the VCS 102 may include one or more vehicle cameras 126. The vehicle cameras 126 may be front or rear view cameras and/or in the vehicle. For purposes of simplicity, a single camera 126 is shown at the front of the vehicle. The output of the camera(s) 126 may be presented on the display 110 and/or on one or more rear-entertainment devices 126.

One or more input controls 120 may also be provided to allow a user to swap between and activate various modules. Signals passing from the microphone 120 may pass through one or more analog-to-digital converters 122 before being passed to the computing unit 106 and vice-versa. Additionally, signals to and from some media components 114 (e.g., AM/FM radio) may also pass through one or more A/D converters 122 before being passed to or from the computing unit 106. For purposes of simplicity, one A/D converter 122 is shown. However, multiple A/D converters 122 may be arranged in the system 102.

The output from one or more vehicle modules of the VCS 102 may be audible and/or visual output. Audible output may be output from one or more in-vehicle speakers 128. The speaker(s) 128 may be connected to an amplifier 130 and may receive its signal from the computing unit 106. In some cases, the signals may pass through a digital-to-analog (D/A) converter (not shown). Visual outputs may be output on the display 110 and/or on one or more rear entertainment devices 124.

The vehicle may include an on-board modem 132 for two-way communication of data and messages between the vehicle and an external network 134. As a non-limiting example, modem 132 may be a USB cellular modem. As an alternative example, the modem may be an embedded modem in the vehicle. The data and messages may be exchanged by communicating with the one or more cellular towers 136.

Alternatively, via a BLUETOOTH transceiver 118 in the vehicle, a communication or pairing may be made automatically with a user's portable (sometimes referred to as "nomadic") device 138 (e.g., mobile phone, smart phone, PDA, or any other device having wireless remote network connectivity) after a vehicle key-on. In some embodiments, pairing the portable device 138 and the BLUETOOTH transceiver 118 may be instructed through one or more buttons or similar input (not shown). The one or more buttons may be one or more hard keys located in the vicinity of the vehicle driver (e.g., and without limitation, on the steering wheel, in the center console, or near the display 110) and/or one or more soft keys shown on the display 18. The soft keys may or may not be touch-sensitive (e.g, on a touchscreen display). Additionally or alternatively, the soft keys may be one or more physical buttons mapped to the one or more soft keys.

In yet an alternative embodiment, connectivity may be accomplished using a USB connection linking the nomadic device 138 with the head unit 104 via a USB module. In some embodiments, this connection may only be enabled using an accessory protocol. Non-limiting examples of accessory protocols include the IPHONE accessory protocol or the ANDROID accessory protocol.

Using the portable device 138, communication with an external network 134 may be accomplished through, for example, communication with a cellular tower 136 and/or a wireless access point 140. Data may be communicated from the vehicle (e.g., from the computing unit 106) to the network 134 utilizing, for example, a data-plan, data over voice, or DTMF tones associated with nomadic device 54.

Additionally or alternatively, the vehicle 10 may be outfitted with one or more wireless modules 142 for wireless communication with the network 134. A non-limiting example of such a wireless communication is any communication system meeting the 802.11 IEEE standard such as WiFi or WiMax. To communicate with the network 134, a connection may be made to a wireless hotspot 140 (or wireless access point)

which may be outside and remote from the vehicle (e.g., and without limitation, at a publically available hotspot venue). In some embodiments, a wireless hotspot may be created in the vehicle and communication with the network 134 may be accomplished by wirelessly connecting one or more compatible devices in the vehicle with the in-vehicle wireless access point. For purposes of simplicity and clarity, FIG. 1 shows an external hotspot 140.

The computing unit 106 may be provided with an operating system including an API to communicate with modem application software. The modem application software may access an embedded module or firmware on the BLUETOOTH transceiver 118 to complete wireless communication with a remote BLUETOOTH transceiver (such as that found in a nomadic device).

The nomadic device 138 may be capable of voice band and/or broadband data communication. A user may be able to transfer data over the voice band using a technique called frequency division multiplexing. Thus, a user of the nomadic device 138 may be able to talk over the device while data is being transferred. If the user has a dataplan associated with the nomadic device 138, broadband transmission may be possible.

Incoming data to the VCS 102 may be passed through the nomadic device 138 via a data-over-voice or data plan through the onboard BLUETOOTH transceiver 118 and into the vehicle's onboard computing unit 106. Alternatively, the data may be passed through the embedded modem 132 via cellular communication to the processor 106. Alternatively, the data may be passed through the wireless module 142 via, e.g., a WiFi connection, to the computing unit 106. Data may be stored in the memory 108 of the VCS 102.

Additional sources that may interface with the VCS 102 may include personal navigation device, vehicle navigation device, onboard GPS devices, or remote navigation systems having connectivity to network 134. Further, the computing unit 106 could be in communication with a variety of other auxiliary devices connected through a wireless or wired connection. Auxiliary devices may include, but are not limited to, personal media players, wireless health devices, portable computers, and the like.

One or more 148 modules for vehicle-to-vehicle (V2V) or vehicle-to-infrastructure (V2I) communication may also communicate with the computing unit 106. The module 148 may be for dedicated short range communications (DSRC), wireless access in vehicular environment (WAVE), WiFi, or other like wireless communication enabling V2V or V2I communication. The module(s) 148 may be transceivers that enable two-way wireless communication capabilities. In addition to being on-board in a vehicle, enabling vehicle to vehicle (V2V) communication with other capable vehicles, nodes may also be roadside units (RSUs) enabling vehicle to infrastructure (V2I) communication.

Figure 2:
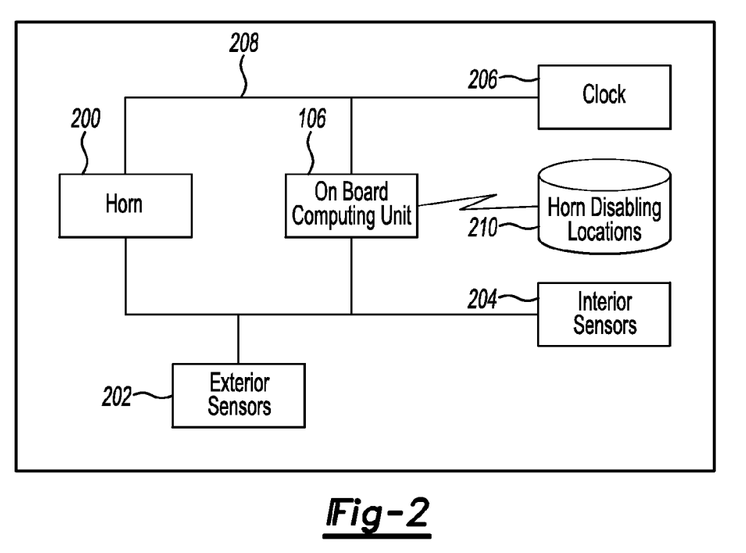
FIG. 2 illustrates a block architecture of a system for disabling a vehicle horn.

FIG. 2 illustrates a vehicle system for disabling a vehicle horn. The various components of the system may communicate over a vehicle network 208. The vehicle may include one or more exterior sensors 202 for detecting objects and/or events outside of the vehicle in response to which one or more messages may be sent to a vehicle horn 200 over the vehicle network 208 for enabling or disabling the vehicle horn 200. In this regard, exterior sensors 202 may detect objects such as pedestrians and/or vehicles. In some embodiments, the exterior sensors 202 may be proximity sensors. In some embodiments, exterior sensors 202 and vehicle camera 126 may be used collaboratively to detect objects in the vehicle's vicinity. Exterior sensors 202 may also transmit one or more message over the network 208 for outputting alerts in the vehicle alerting a vehicle user to the detected object. The alerts may be audible and/or visual alerts. For example, the alerts may be output from the vehicle head unit display 110 and/or from one or more speakers 128. In some embodiments, a vehicle's interior sensors 204 may also be used in disabling and/or enabling the vehicle horn. Interior sensors 204 may include, but are not limited to, brake sensors and one or more internal cameras.

Enabling and disabling of the horn may be based on specific rules programmed as logic to the horn disabling system. The horn disabling system may be communicating with the VCS 102. If a horn is disabled in accordance with the disabling rules, the rules may also include rules for overriding the disabled horn when necessary (as described below). While the various embodiments are described with a vehicle having a head unit 104, this may not necessarily be the case. In some cases, a vehicle, such as many entry-level vehicles, may not have a head unit 104. Nevertheless, the entry-level vehicle may still have an onboard computing unit 106 and memory 108 to which the rules may be programmed. In some embodiments, the logic may be embedded in software.

In some embodiments, a vehicle may exchange information with one or more other vehicles such as information obtained from the one or more exterior sensors 202. As one example, a vehicle may alert another about the one vehicle approaching the other. The alerts may be a vehicle seat vibration, repeated brake light flashing, graphics shown on a display 110, and the like. The messages received during a V2V or a V2I exchange may be transmitted within the vehicle over a vehicle network.

In some embodiments, a vehicle clock 206 may be used to monitor for how long a vehicle user presses the vehicle horn. Many vehicle drivers excessively prolong a vehicle honk. By monitoring the time period, the system may limit the length of time that the horn can be pressed. When the horn 200 is pressed, the timer 206 may be started. After a certain threshold period of time, one or more messages may be transmitted over the network 208 to disable the horn. The system may use a software based timer, the vehicle's clock, the GPS clock, or any other timer. Further details will be described below.

One or more points along a route where honking is disabled by the vehicle (herein sometimes referred to as "horn disabling zones") may be stored in a database 210 and/or local memory. The database 210 may be onboard the vehicle (e.g., on the onboard computing system) and/or offboard (e.g., remote from the vehicle) and communicating with the vehicle over network 134. In some embodiments, navigation, if available, may also be performed off-board. As the vehicle is driving along a route, the embedded logic may have instructions for retrieving location information from the database 210 based on the vehicle's current location. The horn disabling zone locations may be retrieved from the database and stored, at least temporarily, in memory. The horn disabling zones may be identified by comparing the current location (based on GPS coordinates) and the location in the database 210 of the horn disabling zones. If the database is remote from the vehicle, the location information may be transmitted to the vehicle via network 134. In some embodiments, a user may be able to retrieve a listing of horn disabling zones, e.g., via one or more commands input at the head unit 104. Other methods of obtaining point along a route where the horn is disabled may be utilized without departing from the scope of the invention. As one non-limiting example, road sign information, such as school zone signs or hospital signs, can be detected by the external camera 126 and, using one or more image processing algorithms, one or more horn disabling zones detected.

Figure 3:
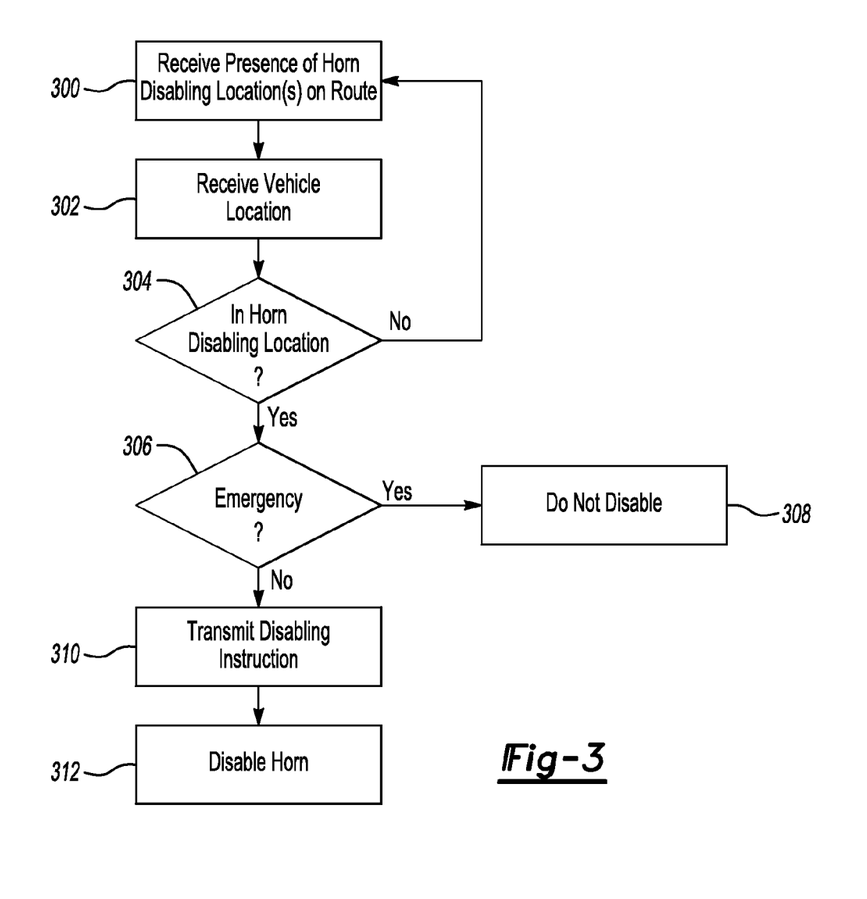
FIG. 3 is a process for disabling a vehicle horn at one or more particular points on a route.

FIG. 3 illustrates a process for disabling a vehicle horn at one or more particular points along a route. Disabling the vehicle horn occurs automatically while the vehicle is en route. Further, the logic for disabling the vehicle horn may be started and run at vehicle start up. The location of one or more horn disabling locations (or horn disabling zones) may be received from the database 210 in response to instructions from the embedded logic (block 300). The location of the vehicle may be obtained by the GPS module 116 communicating with a GPS satellite (block 302). Based on this GPS data, the location of the vehicle may or may not be tracked on a route calculated by a navigation system, if available in the vehicle.

Based on the comparison of the locations, it may be determined whether the vehicle is in a horn disabling zone (block 304). A horn disabling zone is any point along a route where the horn is disabled. The horn disabling zones may be based on locations in or around which honking will cause a disturbance or a distraction to its occupants or those present in the particular location. Horn disabling zones may be in geographic regions where penalties are imposed for honking as a non-emergency event. Non-limiting examples of horn disabling zone may be in the vicinity of, in front of, or around buildings, hospitals, schools, private residences, temples, and crosswalks. In some embodiments, the location of the horn disabling zone(s) may be displayed along the route if the vehicle is outfitted with a navigation system.

If the vehicle is not in the horn disabling zone, additional horn disabling zones along the route may be received (block 300) and the vehicle location may continue to be received via the GPS module 116 (block 302). If in a horn disabling zone, a further determination may be made if the vehicle is in an emergency (block 306). Emergency events may include, but are not limited to, a potential collision with another vehicle (e.g., the vehicle in front suddenly stops or is backing up while the honking vehicle is directly behind it), pedestrian, bicyclist, or the like. The emergency event may be detected by one or more of the exterior sensors 202. If the vehicle is in an emergency, the horn may not be disabled, or an override of the disabled horn may be set, in order to permit the vehicle user to warn others of the emergency (block 308). In some embodiments, one or more alerts may be output in the vehicle to notify the vehicle driver of the potential emergency. One or more internal sensors 204 may also be used to detect an emergency. For example, information received from the brakes (e.g., and without limitation, sudden braking), vehicle distance control signals, and/or an internal camera may be used to detect an emergency event. In such events, the vehicle may also initiate additional collision avoiding operations as shown with respect to FIG. 4 (described below).

In some embodiments, the vehicle camera 126 may be used to detect the emergency event. Using object detection and/or lane tracking methods, objects including, but not limited to, animals, pedestrians and/or vehicles (motorized and non-motorized, such as bicycles) and vehicle components (e.g., and without limitation, taillights) may be identified by the camera 126. The camera 126 may also detect crosswalks, vehicle lanes, bicycles lanes, and the like. In response, the horn is not disabled or an override of the disabled horn implemented based on the circumstances of the environment (as described in FIG. 4).

If the vehicle is not in an emergency (block 306) and is also in a horn disabling zone, one or more messages to disable the horn may be transmitted over the vehicle network to the vehicle horn 200 (block 310). The messages may be transmitted as one or more vehicle network messages in response to one or more instructions output by the embedded logic on the onboard computing unit 106. Based on the message(s), the horn may be disabled (block 312).

The camera 126 may also be used to detect when the horn is being used during non-emergency events and outside of a disabling zone. The horn may be disabled where, for example, the vehicle user honks at another vehicle while sitting at a traffic light or honks at strolling pedestrians crossing a crosswalk or bicyclists riding in a bicycle lane along a road. The location of the vehicle (e.g., that it is outside of the horn disabling zone) may be determined from GPS data. When the horn is being used in such circumstances, one or more messages that the horn is in use may be transmitted over the vehicle network. Based on this information, the camera 126 may be activated to capture images of the non-emergency event. One or more vehicle network messages may be transmitted to the vehicle horn to disable it in response to the camera detecting any non-emergency event. In some embodiments, the camera 126 may be continuously capturing the environment to detect honking violations.

Figure 4:
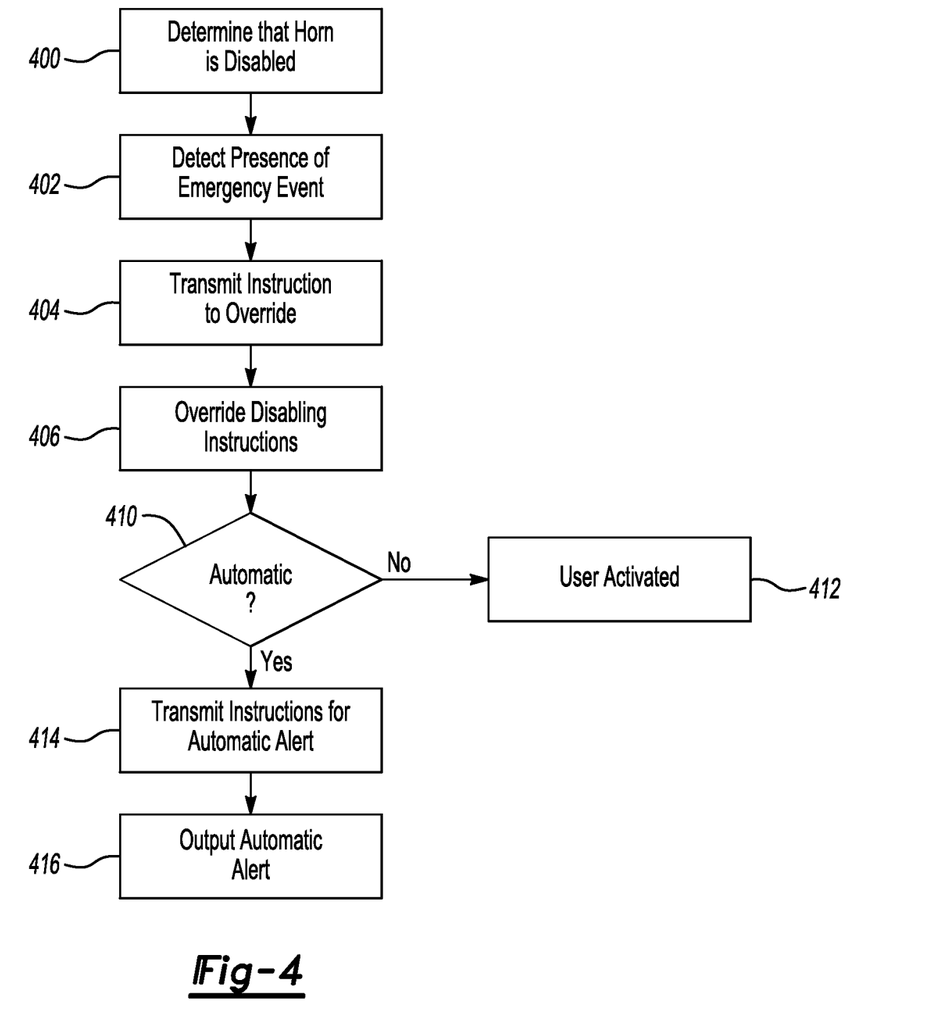
FIG. 4 is a process for overriding a disabled horn at one of the particular points on the route.

FIG. 4 illustrates a process for overriding a disabled horn during one or more points on a route. The override may occur when in a horn disabling zone if an emergency event occurs. Based on GPS coordinates, the vehicle may determine that it is in a horn disabling zone (block 400). During a non-emergency event, the horn would be typically disabled.

While in the horn disabling zone, the vehicle may detect the presence of an emergency event (block 402) based on one or more vehicle events. Non-limiting examples of emergency events may include a sudden stop by another vehicle, an approaching vehicle, a crossing pedestrian or bicyclist detected in front of the vehicle, and the like. Using one or more of exterior sensors 202 and/or the vehicle camera 126, the vehicle may detect the object. The object may be detected based on the proximity as determined by the sensors 202, detection by the vehicle camera 126 of the object in the field of view, detection by the vehicle camera 126 of an approaching vehicle (e.g., a reversing vehicle), and/or an identification of brake lights on vehicles as identified by the vehicle camera 126. An emergency event may be identified, and an override of the disabled horn set, if the vehicle is a predetermined distance from the object.

An emergency event may additionally or alternatively be identified when one or more messages are received from the vehicle brake control module (or other interior sensor 204) identifying a sudden braking (e.g., in response to a vehicle in front suddenly braking or avoiding a collision with an approaching vehicle). Additionally or alternatively, the vehicle may detect a sudden braking based on a calculation of a change in speed of the vehicle as a function of distance. These events may be used by the logic as a trigger to override the disabled horn. In some embodiments, the interior sensor 204 may be a camera and radar for detecting the emergency event.

The horn may be associated with one or more enabling and/or disabling instructions or related instructions. Based on the instruction, a status of the horn may be established, which may be checked to determine or confirm a disabled status. In some embodiments, the horn is always enabled unless the disabling instruction is executed. In some embodiments, the disabling instruction may be an "on" instruction when the horn is disabled in accordance with the various embodiments. Other non-limiting disabling instructions may include a "horn disabled=TRUE" instruction, a binary instruction, and the like.

A related instructions to the disabling instructions may be an override instruction. If the horn is disabled when an emergency event is detected, one or more instructions may be transmitted in order to override the disabled horn (block 404). In some embodiments, the override may include sending an "off" command to the horn which turns the disabled horn off. The instruction(s) may be received by the horn, via the vehicle network, and an override of disabled horn set (block 406). Other non-limiting disabling instructions may include a "horn disabled=FALSE" instruction, a "horn override=TRUE" instruction, a binary instruction, and the like. In some embodiments, no instruction is sent when an emergency event is detected.

In some embodiments, if the vehicle is configured with a head unit, a message may be output to the user to honk the horn. The message may be an audible or visual alert including, but not limited to, a voice message, a beep, chime, alarm, and the like. If there is no head unit, an audible alert may be output from the speaker to honk.

In some embodiments, logic may be included for outputting an automatic honk (e.g., without user intervention). One or more signals, which may be triggered based on information that an emergency event is imminent, may be output via the head unit 104 over the vehicle network and transmitted to the horn. In some embodiments, a separate electronic control unit (not shown) may process information and transmit the signal(s) via the vehicle network. The signal(s) may be triggered based on information received from one or more sensors 202, 204, one or cameras 126, or both.

In some embodiments, automatic honking may be triggered based on user behavior (block 410). If the user initiated or activated the honk, automatic honking is not triggered for the specific emergency event (block 412). If the user has not honked, after a threshold period of time, instructions may be transmitted for an automatic alert (block 414). The period of time may be in milliseconds or seconds. The automatic alert may be output in response to the instructions (block 416).

Another non-limiting example of a threshold trigger may be a distance between the vehicles. As the distance between the vehicle having the disabled horn and another vehicle shortens, the automatic honk is triggered when the distance has reached a threshold distance. If the user has honked the horn before the threshold distance is reached, an automatic honk may not be triggered.

In some embodiments, one or more audible alerts may be output in the vehicle to alert the driver to honk the horn in the emergency event. One or more sensors 204 for monitoring the proximity of the vehicle to an object (e.g., a parking distance control (PDC) sensor) may be perpetually activated. In cases where such sensors are not available in a vehicle or the alert(s) is ignored, the automatic honk signal will be transmitted.

In some embodiments, the honk may be an electronically synthesized vehicle sound (which may sound like a honk from a horn) output from the vehicle. The vehicle sound may be generated and output using various acoustical techniques.

Figure 5:
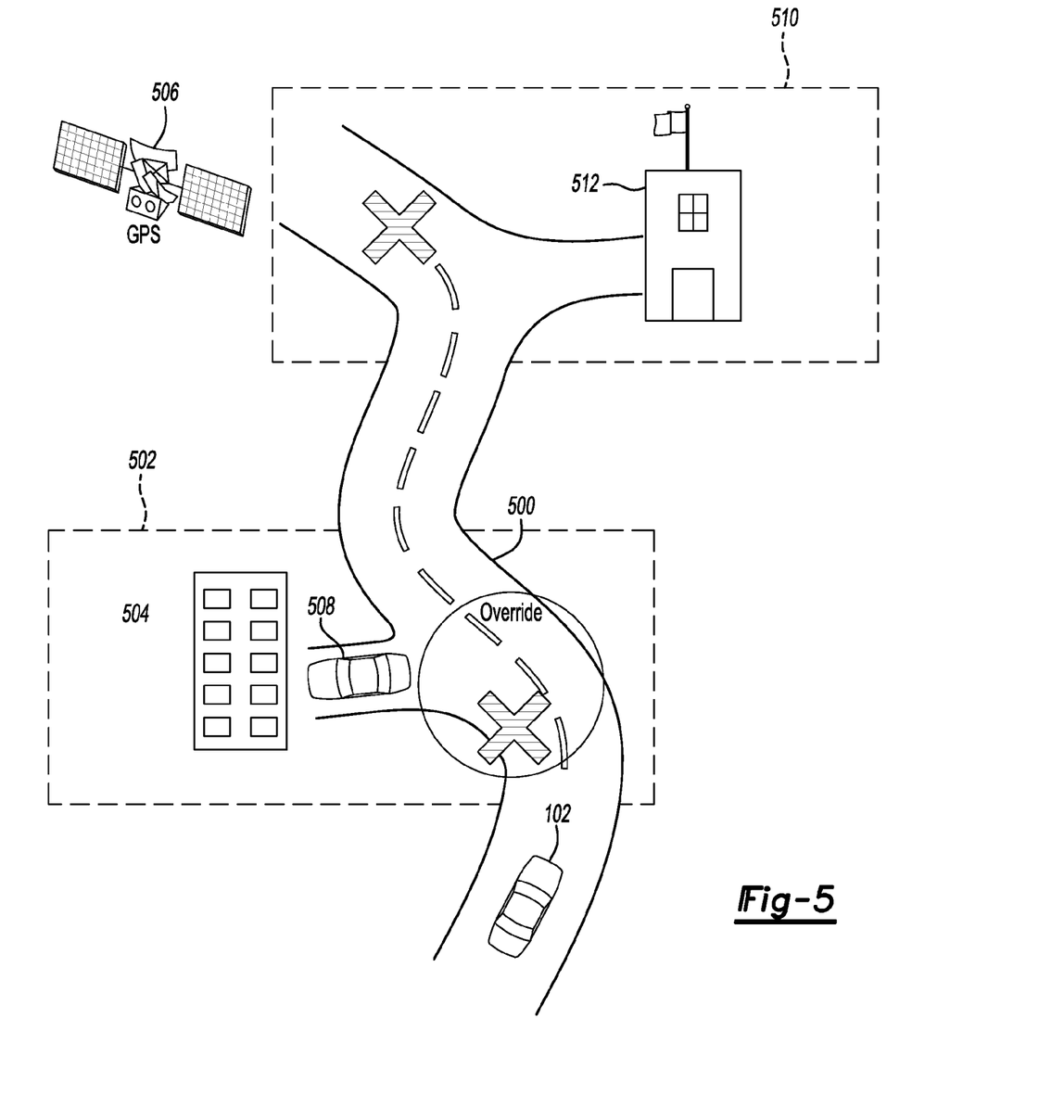
FIG. 5 is an illustration showing non-limiting examples of points along a route where a vehicle's horn is disabled and/or a disabled horn is overridden.

FIG. 5 is a graphical depiction illustrating one or more points on a route where a horn may be disabled and where an override of a horn disabling may occur. As vehicle travels along a road 500 (which may or may not be in accordance with a navigation route), the vehicle may enter a horn disabling zone 502 in the vicinity of which the horn of the vehicle may be disabled. The location of the vehicle and the location of the horn disabling zone may be determined based on GPS data received by the GPS module 116 from the GPS satellite 506. Additionally or alternatively, the location of the horn disabling zone(s) may be determined based on image processing of road signs (e.g., and without limitations, hospital zone signs, school zone signs, residential zone signs, and the like). As shown in FIG. 5, as a non-limiting example, the horn may be disabled when the vehicle is in front of a hospital 504 (represented by the X).

While travelling on the road 500, a vehicle 508 is entering the road 500 as the vehicle approaches the horn disabling zone 502. To avoid the potential collision and to warn the vehicle 508 of the emergency event, an override of the disabled horn may occur (shown in FIG. 5 by the circled area) based on information received by the vehicle which identifies an emergency event (as described above).

As the vehicle leaves the horn disabling zone 502, the disabled horn is turned off (the horn is enabled). Continuing further, the horn may be again disabled when in the vicinity of another horn disabling zone 510. In the non-limiting example shown in FIG. 5, the horn disabling zone may be in the vicinity of a school 512. In this example, the vehicle horn is disabled when in front of the school 512. Again, an override may occur if a potential emergency event is detected. Thus, it will be appreciated that a horn may be disabled and an override occur one or more times along a travelled route. Again, as the vehicle leaves the horn disabling zone 510, the disabled horn is turned off (the horn is enabled).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method for disabling a vehicle horn, the computer-implemented method comprising:
   receiving at a vehicle computer a location of a vehicle;
   receiving at the vehicle computer a location of one or more zones along a route where a vehicle horn is disabled;
   based on the location of the vehicle and the location of the one or more vehicle horn disabling zones, determining at the vehicle computer that the vehicle is in the one or more vehicle horn disabling zones;
   transmitting one or more instructions from the vehicle computer to the vehicle horn to disable the vehicle horn when in the one or more vehicle horn disabling zones, wherein the instructions are received at the vehicle horn from the vehicle computer, and wherein the vehicle horn is disabled based on the one or more instructions;
   detecting at the vehicle computer an emergency event at the one or more vehicle horn disabling zones, wherein the vehicle horn is re-enabled upon detecting the emergency event;
   after the vehicle horn is re-enabled upon detecting the emergency event:
   automatically honking the vehicle horn if a user does not initiate a honking event and a determined parameter reaches a threshold; and
   not automatically honking the vehicle horn if the user does initiate a honking event when the determined parameter is below the threshold.

2. The computer-implemented method of claim 1, wherein the vehicle horn is disabled automatically while the vehicle is en route, and wherein the re-enabling of the vehicle horn upon detecting the emergency event is a re-enablement of the automatically-disabled horn.

3. The computer-implemented method of claim 2 wherein the location of the vehicle and the location of the one or more vehicle horn disabling zones is determined from GPS data.

4. The computer-implemented method of claim 2 wherein the vehicle horn is re-enabled by:
  transmitting overriding instructions by the vehicle computer to the vehicle horn to re-enable the horn based on detecting the emergency event.

5. The computer-implemented method of claim 4 further comprising:
  receiving at the vehicle computer one or more images from a vehicle-based camera of one or more objects in a field of view of the vehicle-based camera; and
  identifying at the vehicle computer the emergency event based on the one or more images.

6. The computer-implemented method of claim 5 further comprising capturing by the vehicle-based camera the one or more images of the one or more objects in the field of view of the vehicle-based camera.

7. The computer-implemented method of claim 5 wherein the one or more objects include one or more vehicles, one or more vehicle taillights, one or more pedestrians, or one or more animals.

8. The computer-implemented method of claim 2 further comprising storing the one or more vehicle horn disabling zones in a database.

9. A system for disabling a horn at one or more horn disabling locations on a route, the system comprising:
  at least one vehicle computer configured to:
    receive information defining one or more zones where a vehicle horn is disabled;
    receive information identifying that a vehicle is in the one or more horn disabling zones;
    based on the defining information and the identifying information, transmit one or more instructions to the vehicle horn to disable the vehicle horn; and
    detect an emergency event at the one or more vehicle horn disabling zones, wherein the vehicle horn is enabled in the horn disabling zone in response to the emergency event; and
  a vehicle clock, wherein, when the vehicle is out of the one or more horn disabling zones, the at least one vehicle computer is configured to:
    monitor the vehicle clock in accordance with a time period of vehicle horn use;
    determine that the vehicle horn is in use; and
    transmit the one or more instructions to the vehicle horn to disable the vehicle horn when the use has exceeded the time period.

10. The system of claim 9 wherein the at least one vehicle computer configured to receive information identifying the location of the vehicle is configured to:
  receive GPS data identifying the location of the vehicle;
  receive GPS data identifying the location of one or more zones along a route where a vehicle horn is disabled; and
  based on the GPS data, determining that the vehicle is in the one or more vehicle horn disabling zones.

11. The system of claim 9 wherein the at least one vehicle computer configured to receive information identifying the location of the vehicle is configured to:
  receive one or more images of one or more road signs identifying the one or more horn disabling zones;
  process the one or more images for identifying that the vehicle is in the one or more horn disabling zones.

12. The system of claim 11 further comprising at least one vehicle camera communicating with the at least one vehicle computer that captures the one or more images of the one or more road signs.

13. The system of claim 9 further comprising a storage device communicating with the at least one vehicle computer and storing the one or more locations where a vehicle horn is disabled.

14. The system of claim 13 wherein the at least one vehicle computer configured to receive the defining information is configured to receive the defining information from the storage device.

15. The system of claim 9 wherein the storage device is a database or memory.

16. The system of claim 9 further comprising a vehicle network, which includes an infotainment system, over which the one or more instructions to disable the vehicle horn are transmitted.

17. The system of claim 9 wherein the at least one vehicle computer, when outside of the one or more horn disabling zones, is further configured to:
  determine that the vehicle horn is in use during a non-emergency event; and
  transmit the one or more instructions to the vehicle horn to disable the vehicle horn.

18. A system for controlling honking of a vehicle horn in one or more vehicle horn disabling locations, the system comprising:
  at least one vehicle computer configured to:
    receive information defining one or more zones where a vehicle horn is disabled;
    receive information identifying that a vehicle is in the one or more horn disabling zones;
    transmit one or more instructions to the vehicle horn to disable the vehicle horn when the vehicle is in the one or more vehicle horn disabling zones;
    detect one or more emergency events while the vehicle is in the one or more horn disabling zones; and
    upon detecting the one or more emergency events, transmit one or more restricting or overriding instructions to the vehicle horn for restricting or overriding the one or more instructions to disable the vehicle horn while in the one or more horn disabling zones to re-enable the horn; and
    after the vehicle horn is re-enabled upon detecting the emergency event:
      transmit one or more instructions to the vehicle horn to automatically honk the vehicle horn if a user does not initiate a honking event and a determined parameter reaches a threshold; and
      not transmit one or more instructions to the vehicle horn to automatically honk the vehicle horn if the user does initiate a honking event when the determined parameter is below the threshold.

19. The system of claim 18 wherein the at least one vehicle computer configured to detect one or more emergency events detects the emergency events based on information relating to one or more objects detected by the vehicle by one or more vehicle sensors or one or more vehicle cameras.

20. The system of claim 19 wherein the one or more objects include one or more vehicles, one or more vehicle taillights, one or more pedestrians, or one or more animals.

21. The system of claim 18 wherein the at least one vehicle computer is further configured to output an alert in the vehicle when the one or more emergency events are detected.

22. The system of claim 18 wherein the at least one vehicle computer is configured to automatically honk the horn by transmitting one or more instructions to the vehicle horn for honking the horn based on one or more automatic honking triggering events.

23. The system of claim 22 wherein the automatic honking triggering event is based on a threshold time period.

24. The system of claim 22 wherein the automatic honking triggering event is based on a threshold distance between the vehicle and another vehicle.

25. The system of claim 22 wherein the automatic honking triggering event is cancelled based on user behavior.

* * * * *